United States Patent
Huang et al.

(10) Patent No.: US 12,525,292 B2
(45) Date of Patent: Jan. 13, 2026

(54) SYSTEM AND METHOD FOR IN-NAND PATTERN SEARCH

(71) Applicant: SK hynix Inc., Gyeonggi-do (KR)

(72) Inventors: Pengfei Huang, San Jose, CA (US); Fan Zhang, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 201 days.

(21) Appl. No.: 18/481,337

(22) Filed: Oct. 5, 2023

(65) Prior Publication Data
US 2025/0118368 A1    Apr. 10, 2025

(51) Int. Cl.
G06F 21/00    (2013.01)
G11C 7/10    (2006.01)
G11C 15/04    (2006.01)

(52) U.S. Cl.
CPC .......... G11C 15/046 (2013.01); G11C 7/1039 (2013.01); G11C 7/1069 (2013.01)

(58) Field of Classification Search
CPC .... G06F 21/00; H04L 9/3236; H04L 67/1023
See application file for complete search history.

(56) References Cited

U.S. PATENT DOCUMENTS

| | | |
|---|---|---|
| 8,510,311 B2 | 8/2013 | Shibata et al. |
| 9,438,426 B2* | 9/2016 | Li ..................... H04L 9/3242 |
| 2012/0203729 A1 | 8/2012 | Biran et al. |
| 2018/0074722 A1* | 3/2018 | Iwai ..................... G06F 21/00 |
| 2022/0197510 A1* | 6/2022 | Lee ..................... G06F 3/0659 |
| 2022/0221999 A1* | 7/2022 | Navon .................. G06F 3/0608 |

* cited by examiner

*Primary Examiner* — Hoai V Ho
(74) *Attorney, Agent, or Firm* — IP & T GROUP LLP

(57) ABSTRACT

A system and a method for pattern search capable of enabling computation capability inside of a memory device. The memory system searches for a pattern data item in response to a pattern search command, and provide to the host the pattern data item associated with a particular pattern corresponding to the pattern search command. The memory device includes: a decoder configured to receive pattern data item from a plurality of pages, and decode the pattern data item; and a hash comparator configured to compare one or more host hash values with one or more memory hash values, and provide the controller with the decoded pattern data item according to the comparison results between the host hash values and the memory hash values.

20 Claims, 8 Drawing Sheets

SYSTEM AND METHOD FOR IN-NAND PATTERN SEARCH

BACKGROUND

1. Field

Embodiments of the present disclosure relate to pattern search schemes for a memory system.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since the memory devices have no moving parts. Examples of memory systems having such advantages include universal serial bus (USB) memory devices, memory cards having various interfaces such as a universal flash storage (UFS), and solid state drives (SSDs). Memory systems may use various types of decoders.

SUMMARY

Aspects of the present invention include a system and a method for pattern search capable of enabling computation capability inside of a memory device.

In one aspect of the present invention, a system includes: a host configured to generate a pattern search command; and a memory system including a controller and a memory device for storing multiple data items. The memory system is configured to search for a pattern data item among the multiple data items in response to the pattern search command and provide to the host the pattern data item associated with a particular pattern corresponding to the pattern search command. The memory device includes: a plurality of pages for storing the multiple data items including the pattern data item; a decoder configured to receive, from the plurality of pages, the pattern data item, and decode the pattern data item to output the decoded pattern data item; and a hash comparator configured to compare one or more host hash values with one or more memory hash values, and provide the controller with the decoded pattern data item according to the comparison results between the host hash values and the memory hash values. The controller is configured to receive the decoded pattern data item from the memory device, and provide the host with the decoded pattern data.

In one aspect of the present invention, a method operates a memory system including a controller and a memory device. The method includes: providing to the host a pattern data item among multiple data items stored in the memory device, in response to a pattern search command from the host, the pattern data item associated with a particular pattern. The providing of the pattern data item includes: receiving, by a decoder, the pattern data item from a plurality of pages in which the multiple data items including the pattern data item are stored, and decoding the pattern data item to output the decoded pattern data item; comparing, by a hash comparator, one or more host hash values with one or more memory hash values, and providing the controller with the decoded pattern data item according to the comparison results between the host hash values and the memory hash values; and receiving, by the controller, the decoded pattern data item and provide the host with the decoded pattern data.

Additional aspects of the present invention will become apparent from the following description.

DETAILED DESCRIPTION

Figure 1:
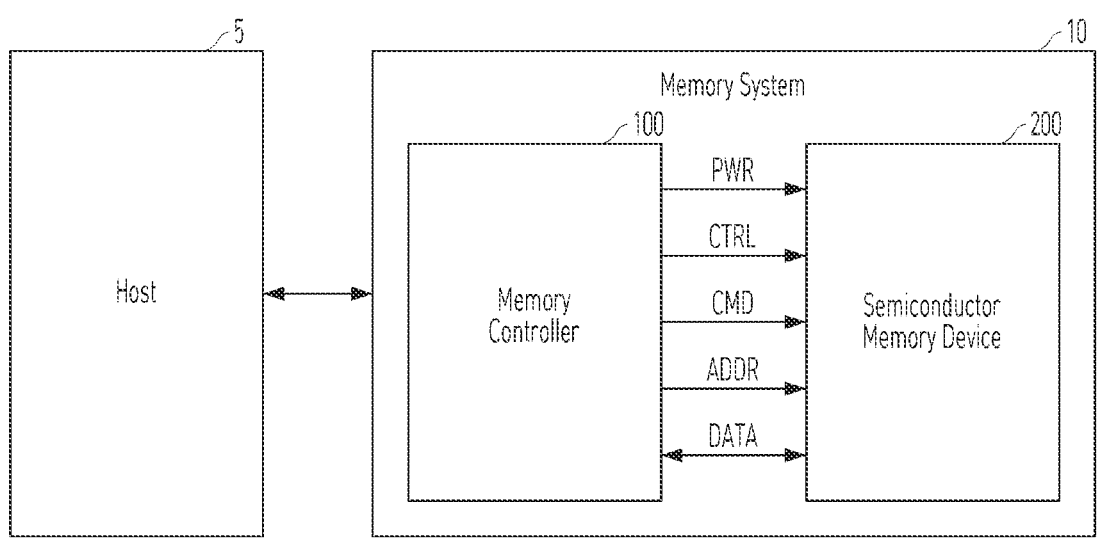
FIG. 1 is a block diagram illustrating a data processing system in accordance with one embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure conveys the scope of the present invention to those skilled in the art. Moreover, reference herein to "an embodiment," "another embodiment," or the like is not necessarily to only one embodiment, and different references to any such phrase are not necessarily to the same embodiment(s). The term "embodiments" as used herein does not necessarily refer to all embodiments. Throughout the disclosure, like reference numerals refer to like parts in the figures and embodiments of the present invention.

The present invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the present invention may take, may be referred to as techniques. In general, the order of the operations of disclosed processes may be altered within the scope of the present invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

A detailed description of the embodiments of the present invention is provided below along with accompanying figures that illustrate aspects of the present invention. The present invention is described in connection with such embodiments, but the present invention is not limited to any embodiment. The present invention encompasses numerous alternatives, modifications and equivalents. Numerous specific details are set forth in the following description in order to provide a thorough understanding of the present invention. These details are provided for the purpose of example; the present invention may be practiced without some or all of these specific details. For clarity, technical material that is known in technical fields related to the present invention may not been described in detail.

FIG. 1 is a block diagram illustrating a data processing system 2 in accordance with one embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any of various types of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any of various types of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
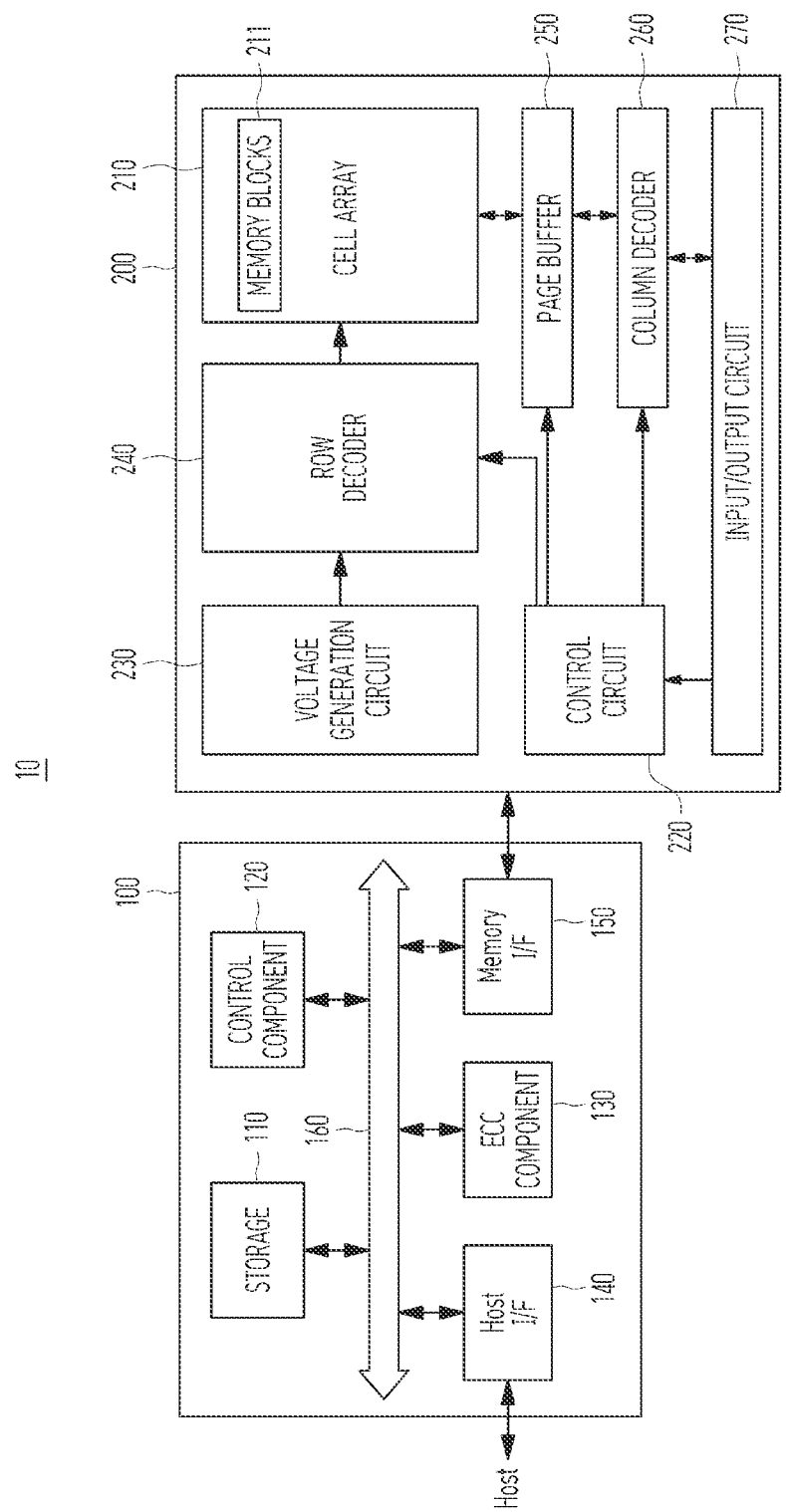
FIG. 2 is a block diagram illustrating a memory system in accordance with another embodiment of the present invention.

FIG. 2 is a block diagram illustrating a memory system in accordance with another embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120 which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200 in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various communication standards or interfaces such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250 which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
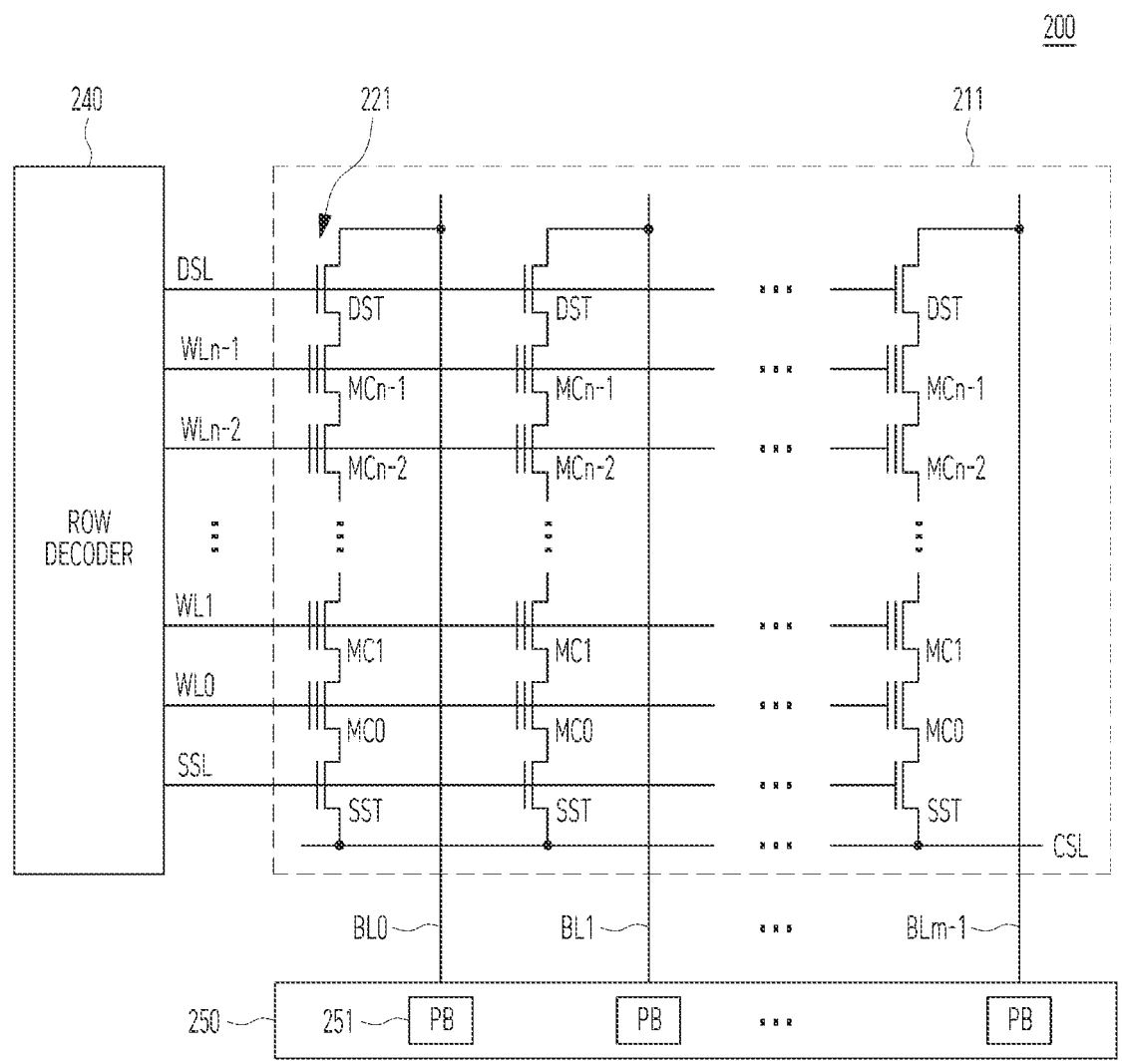
FIG. 3 is a circuit diagram illustrating a memory block of a memory device in accordance with another embodiment of the present invention.

The page buffer 250 may be coupled with the memory cell array 210 through bit lines BL (shown in FIG. 3). The page buffer 250 may precharge the bit lines BL with a positive voltage, transmit data to and receive data from, a selected memory block in program and read operations, or temporarily store transmitted data in response to page buffer control signal(s) generated by the control circuit 220.

The column decoder 260 may transmit data to and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with another embodiment of the present invention. For example, the memory block of FIG. 3 may be any of the memory blocks 211 of the memory cell array 210 shown in FIG. 2.

Referring to FIG. 3, the memory block 211 may include a plurality of word lines WL0 to WLn-1, a drain select line DSL and a source select line SSL coupled to the row decoder 240. These lines may be arranged in parallel, with the plurality of word lines between the DSL and SSL.

The memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm-1. The page buffers 251 may operate in response to page buffer control signals. For example, the page buffers 251 may temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Figure 4:
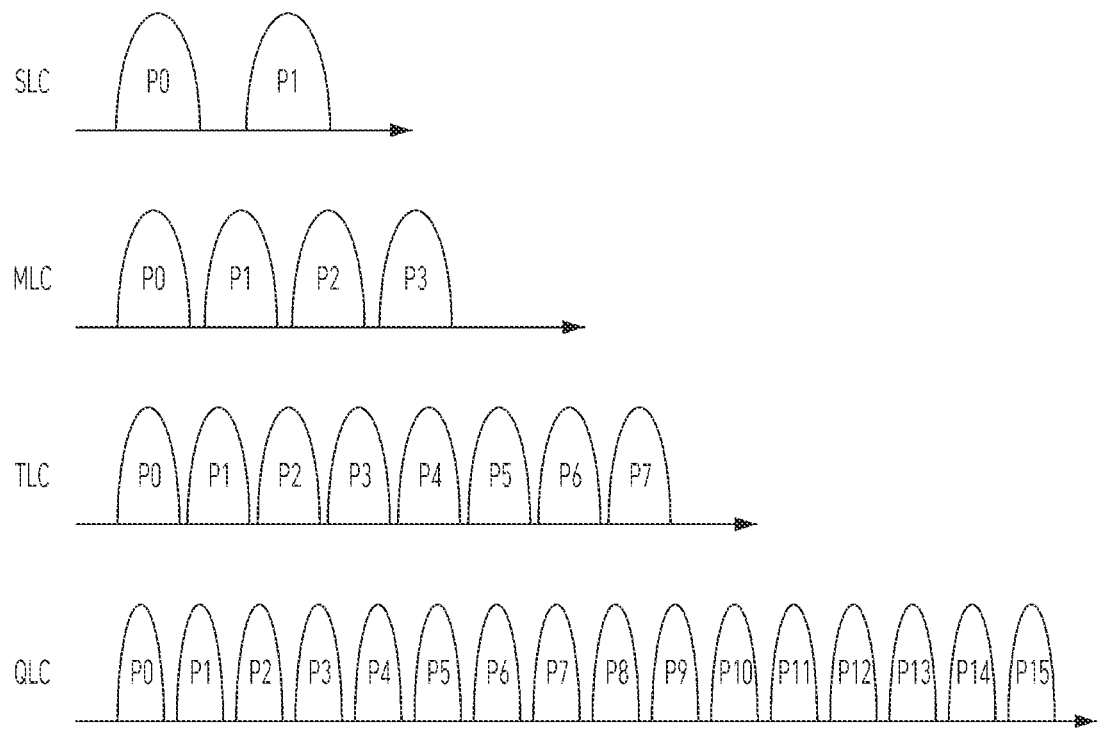
FIG. 4 is a diagram illustrating distributions of states for different types of cells of a memory device in accordance with another embodiment of the present invention.

FIG. 4 is a diagram illustrating distributions of states or program voltage (PV) levels for different types of cells of a memory device in accordance with another embodiment of the present invention.

Referring to FIG. 4, each of memory cells may be implemented with a specific type of cell, for example, a single level cell (SLC) storing 1 bit of data, a multi-level cell (MLC) storing 2 bits of data, a triple-level cell (TLC) storing 3 bits of data, or a quadruple-level cell (QLC) storing 4 bits of data. Usually, all memory cells in a particular memory device are of the same type, but that is not a requirement.

An SLC may include two states P0 and P1. P0 may indicate an erase state, and P1 may indicate a program state. Since the SLC can be set in one of two different states, each SLC may program or store 1 bit according to a set coding method. An MLC may include four states P0, P1, P2 and P3. Among these states, P0 may indicate an erase state, and P1 to P3 may indicate program states. Since the MLC can be set in one of four different states, each MLC may program or store two bits according to a set coding method. A TLC may include eight states P0 to P7. Among these states, P0 may indicate an erase state, and P1 to P7 may indicate program states. Since the TLC can be set in one of eight different states, each TLC may program or store three bits according to a set coding method. A QLC may include 16 states P0 to P15. Among these states, P0 may indicate an erase state, and P1 to P15 may indicate program states. Since the QLC can be set in one of sixteen different states, each QLC may program or store four bits according to a set coding method.

Referring back to FIGS. 2 and 3, the memory device 200 may include a plurality of memory cells (e.g., NAND flash memory cells). The memory cells are arranged in an array of rows and columns as shown in FIG. 3. The cells in each row are connected to a word line (e.g., WL0), while the cells in each column are coupled to a bit line (e.g., BL0). These word and bit lines are used for read and write operations. During a write operation, the data to be written ('1' or '0') is provided at the bit line while the word line is asserted. During a read operation, the word line is again asserted, and the threshold voltage of each cell can then be acquired from the bit line. Multiple pages may share the memory cells that belong to (i.e., are coupled to) the same word line. When the memory cells are implemented with MLCs, the multiple pages include a most significant bit (MSB) page and a least significant bit (LSB) page. When the memory cells are implemented with TLCs, the multiple pages include an MSB page, a center significant bit (CSB) page and an LSB page. When the memory cells are implemented with QLCs, the multiple pages include an MSB page, a center most significant bit (CMSB) page, a center least significant bit (CLSB) page and an LSB page. The memory cells may be programmed using a coding scheme (e.g., Gray coding) in order to increase the capacity of the memory system 10 such as SSD.

Figure 5A:
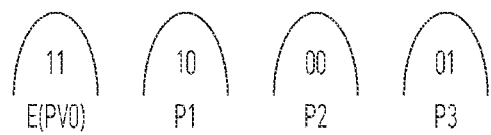
FIG. 5A is a diagram illustrating an example of Gray coding for a multi-level cell (MLC) in accordance with another embodiment of the present invention.

FIG. 5A is a diagram illustrating an example of coding for a multi-level cell (MLC) in accordance with another embodiment of the present invention.

Referring to FIG. 5A, an MLC may be programmed using a set type of coding. An MLC may have 4 program states, which include an erased state E (or PV0) and a first program state PV1 to a third program state PV3. The erased state E (or PV0) may correspond to "11." The first program state PV1 may correspond to "10." The second program state PV2 may correspond to "00." The third program state PV3 may correspond to "01."

Figure 5B:
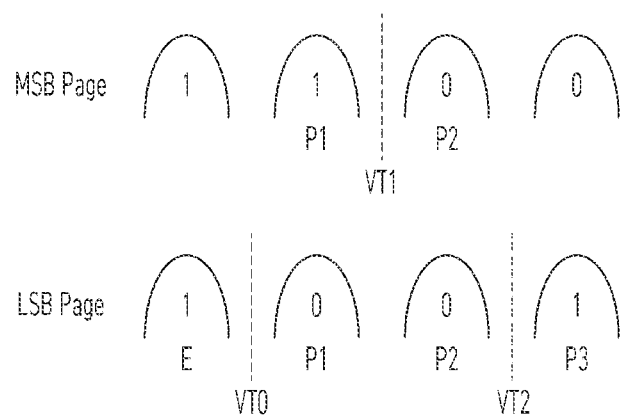
FIG. 5B is a diagram illustrating state distributions for pages of a multi-level cell (MLC) in accordance with another embodiment of the present invention.

In the MLC, as shown in FIG. 5B, there are 2 types of pages including LSB and MSB pages. 1 or 2 thresholds may be applied in order to retrieve data from the MLC. For an MSB page, the single threshold value is VT1. VT1 distinguishes between the first program state PV1 and the second program state PV2. For an LSB page, 2 thresholds include a threshold value VT0 and a threshold value VT2. VT0 distinguishes between the erased state E and the first program state PV1. VT2 distinguishes between the second program state PV2 and the third program state PV3.

The data processing system above may be used in data science. Many applications of data science involve pattern search and matching: for example, finding a certain string in files, comparing an identification (ID) number for the certain string to ID numbers in databases, or searching for content (e.g., voice, image, and video) in large storage clouds. The host 5 of FIG. 1 loads the stored data in the memory system 10 (e.g., SSD) to a host memory (e.g., DRAM), and then conducts pattern search and matching tasks at the host side. The pattern search and matching operation may be performed by a system 600 as shown in FIG. 6.

Figure 6:
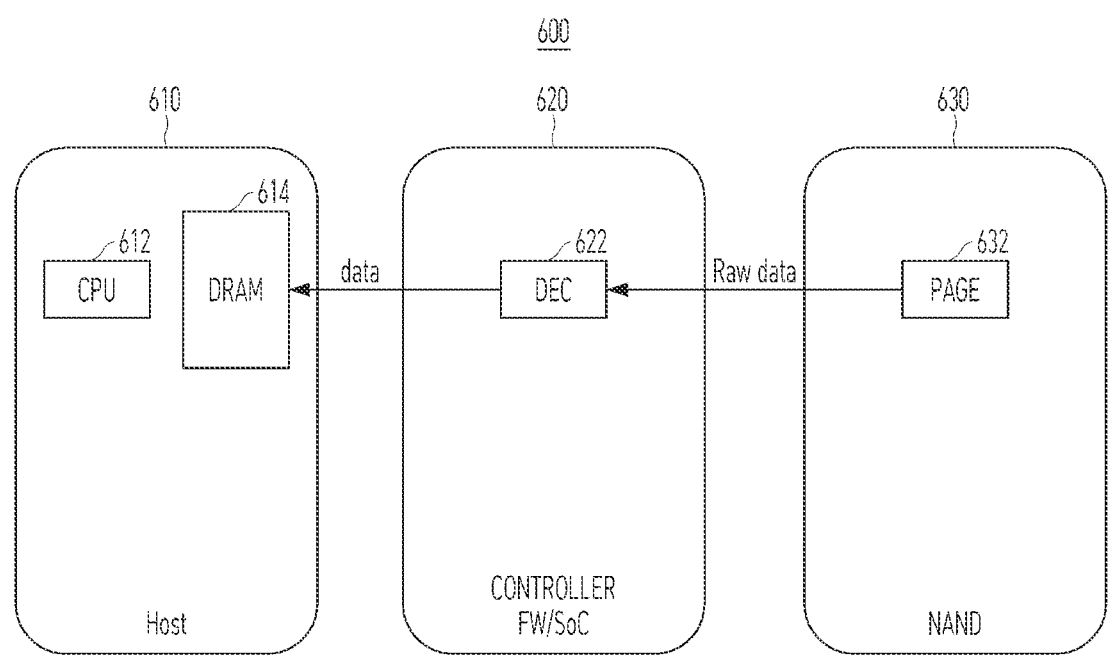
FIG. 6 is a diagram illustrating an example of a pattern search operation performed by an example of a data processing system in FIG. 1.

Referring to FIG. 6, the system 600 may include a host 610, a controller 620 and a memory device 630, which correspond to the host, the memory controller 100 and the memory device 200 of the data processing system shown in FIGS. 1 and 2, respectively. The memory device 630 may include a plurality of pages 632. The controller 620 may include a decoder (DEC) 622. The host 610 may include a central processing unit (CPU) 612 and a host memory (e.g., DRAM) 614. In various examples, the controller 620 may be implemented with firmware and system on chip (SoC), and the memory device 630 may be implemented with a NAND flash memory.

When the host 610 runs a pattern search task, the host 610 first communicates with the controller 620 such that related data that is stored in the memory device (e.g., NAND) 630 and associated with the pattern search task is loaded to the host memory 614. Then, the pattern search is executed using the data loaded in the host memory 614. Specifically, the data loading uses two transfer stages. First, raw data (i.e., noisy codeword) is moved from the memory device 630 to the controller 620. The decoder 622 of the controller 620 decodes the raw data. Then, the controller 620 transfers the decoded data to the host 610.

As such, it takes some time to finish the data movement for the pattern search procedure, because this procedure requires the two data transfer steps to move the data from the memory device 630 to the host 610. Such data transfers consume a lot of power. Moreover, the performance of a pattern search task may be limited by NAND-to-Controller I/O and Controller-to-Host I/O, either of which could potentially become a bottleneck.

To address these issues, embodiments of the present invention provide an architecture and method for pattern search and matching capable of both improving the performance of a pattern search and reducing the power consumption of data transfer associated with the pattern search. Embodiments of the present invention provide computation capability inside a memory device (e.g., NAND). That is, the pattern search of the embodiments is executed inside the memory device, and the memory device only needs to send back pattern search results to a host. This architecture avoids transferring a large amount of data from the memory device to the host.

Figure 7:
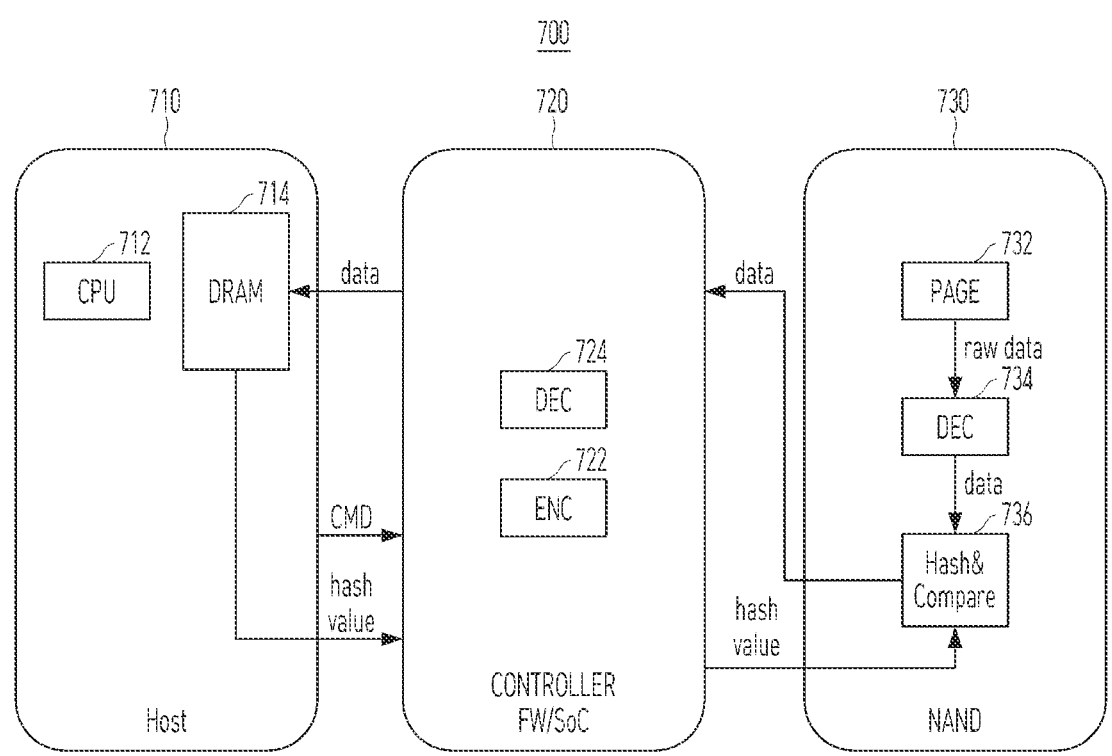
FIG. 7 is a diagram illustrating a data processing system in accordance with another embodiment of the present invention, and a pattern search operation performed by the data processing system.

FIG. 7 is a diagram illustrating a data processing system 700 in accordance with another embodiment of the present invention, and illustrates components for a pattern search operation performed by the data processing system.

Referring to FIG. 7, the data processing system 700 may include a host 710, a controller 720 and a memory device 730. In the illustrated embodiment, the host 710 may include a central processing unit (CPU) 712 and a host memory (e.g., DRAM) 714. The controller 720 may include an encoder (ENC) 722 and a decoder (DEC) 724 and be coupled to the host 710 and the memory device 730. The memory device 730 may include a plurality of pages 732, a decoder (DEC) 734 and a hash comparator 736 and be coupled to the controller 720. The host 710, the controller 720 and the memory device 730 may include other elements such as elements shown in FIGS. 1 and 2. That is, the controller 720 and the memory device 730 may be a memory system corresponding to the memory system 10 including the controller 100 and the memory device 200 shown in FIGS. 1 and 2. In some embodiments, the controller 720 may be implemented with firmware and system on chip (SoC), and the memory device 730 may be implemented with a NAND flash memory. In one embodiment, the encoder 722 and decoder 724 may be embodied in the ECC component 130 of the controller 100 shown in FIG. 2. Other suitable arrangements may be employed as well, as described below. In general, the encoder 722 and the decoders 724, 734 may be implemented by hardware, software, firmware, or any suitable combination thereof.

The plurality of pages 732 of the memory device 730 may store multiple data items. The host 710 may generate a pattern search command CMD. The memory device 730 may search for a pattern data item among the multiple data items stored in the plurality of pages 732, in response to the pattern search command CMD from the host 710. The memory device 730 and controller 720 may provide to the host 710 the pattern data item associated with a particular pattern corresponding to the pattern search command CMD.

The decoder 734 may receive, from the plurality of pages 732, the pattern data item (i.e., raw data) corresponding to the pattern search command. The decoder 734 may decode the pattern data item to output the decoded pattern data item (i.e., data). In one embodiment, the decoder 734 may be implemented with a decoder which performs decoding according to an error correction code (ECC).

The hash comparator 736 may compare one or more host hash values with one or more memory hash values, and provide the controller 720 with the decoded pattern data item (i.e., data) according to the comparison results between the host hash values and the memory hash values.

The controller 720 may receive the decoded pattern data item (i.e., data) from the memory device 730, and provide the host 710 with the decoded pattern data (i.e., data).

As such, the pattern search operation of the embodiments of the present invention may be performed by internal elements of the memory device 730, including the decoder 734 and the hash comparator 736. The pattern search operation of the embodiments may be referred to as In-NAND pattern search procedure.

As shown in FIG. 7, the decoder 734 and the hash comparator 736 may be included in the memory device 730. The input of the decoder 734 may be a noisy codeword, and the output of the decoder 734 may be decoded data (i.e., information part of the codeword).

The inputs of the hash comparator 736 may be the decoded data from the decoder 734 and hash values from the host 710 through the controller 720. When the hash comparator 736 finds a match of computed hash values and the hash values from the host 710, the hash comparator 736 may transfer the corresponding decoded data to the host 710 through the controller 720.

Figure 8:
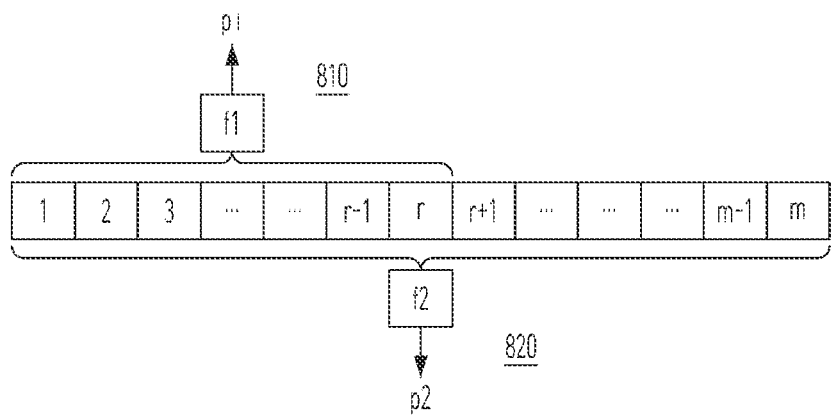
FIG. 8 illustrate an operation of generating hash values in accordance with another embodiment of the present invention.

Embodiments of the present invention may provide a two-level hashing and comparing scheme, as shown in FIG. 8. In the illustrated embodiment of FIG. 8, the host 710 may search for a binary sequence L of m bits in a dataset stored in the memory device 730. In some embodiments, the binary sequence L represents a file, an image, a video, etc.

Referring to FIG. 8, the host 710 may generate two host hash values p1 and p2 using hash functions f1(·) and f2(·), respectively. The first host hash value p1 may be generated (or calculated) based on a portion L[1, 2, . . . , r] of the whole sequence L[1, 2, . . . , m], where r is less than m. L[1, 2, . . . , r] represents the first r bits of the whole sequence L[1, 2, . . . , m] (i.e., m bits). In operation 810, the first host hash value p1 may be generated by applying the first hash function f1(·) to the portion L[1, 2, . . . , r], which is represented as: p1=f1(L[1, 2, . . . , r]). In operation 820, the second host hash value p2 may be calculated using the whole sequence L[1, 2, . . . , m]. The second host hash value p2 may be generated by applying the second hash function f2(·) to the whole sequence L[1, 2, . . . , m], which is represented as: p2=f2(L[1, 2, . . . , m]). That is, the host 710 may generate two host hash values: p1=f1(L[1, 2, . . . , r]), and p2=f2(L[1, 2, . . . , m]). The computing of p1 is faster than the computing of p2, because the portion L[1, 2, . . . , r] is shorter than the whole sequence L[1, 2, . . . , m].

Referring back to FIG. 7, the host hash values p1 and p2 may be stored in the host memory (DRAM) 714. The host 710 may send a pattern search command CMD to the controller 720. Also, the host 710 may send to the controller 720 the host hash values p1 and p2. The controller 720 may bypass the encoder 722 and send, to the memory device 730, the pattern search command and the host hash values p1 and p2. The host hash values p1 and p2 may be provided to the hash comparator 736 of the memory device 730 through the controller 720.

In response to the pattern search command, the memory device 730 may read raw data from the plurality of pages 732. The raw data may include pattern data item corresponding to the pattern search command, among the multiple data items stored in the plurality of pages 732. The raw data may be provided to the decoder 734. The decoder 734 may decode the raw data to generate decoded data, and provide the decoded data to the hash comparator 736.

The hash comparator 736 may run the two-level hashing and comparing scheme. In the similar manner as shown in FIG. 8, the hash comparator 736 may generate two memory hash values q1 and q2 using hash functions f1(·) and f2(·), respectively, which in one embodiment are the same hash functions noted above. The hash comparator 736 may first calculate a first memory hash value q1 by applying the first hash function f1(·) to a small portion of the decoded data from the decoder 734. In one embodiment, the small portion may have the same number of bits as used for the host 710 to calculate the first memory hash value p1 (i.e., r bits). Then, the hash comparator 736 may compare the first memory hash value q1 with the first host hash value p1. When the first memory hash value q1 is equal to the first host hash value p1, the hash comparator 736 may continue to calculate the second memory hash value q2 by applying the second hash function f2(·) to the whole decoded data from the decoder 734. In one embodiment, the whole decoded data may have the same number of bits as the host 710 used to calculate the second host hash value p2 (i.e., m bits). Then, the hash comparator 736 may compare the second memory hash value q2 with the second host hash value p2. When the second memory hash value q2 is equal to the second host hash value p2, i.e., the second memory hash value q2 matches the second host hash value p2, the hash comparator 736 may transfer the corresponding decoded data to the controller 720.

The controller 720 may bypass the decoder 724 and send the decoded data to the host 710. That is, the memory device 730 may transfer the corresponding decoded data to the host 710 through the controller 720. Further, the hash comparator 736 of the memory device 730 may report, to the host 710, the fact that a match between host hash values and memory hash values is found. The host 710 may receive the decoded pattern data item corresponding to the pattern search command.

The two-level hash calculation and comparison scheme may be implemented with pseudo codes as shown in the following list. Here, the data from In-NAND decoder 734 may be denoted by D of length n.

```
FOR i = 1 to n-m+1
    Compute q1 = f1( D[i, i+1, ..., i+r-1] )
    IF q1==p1 THEN
        Compute q2 = f2( D[i, i+1, ..., i+m-1] )
        IF q2==p2 THEN
            A match is found and send the matched data to SSD
        controller
        ENDIF
    ENDIF
ENDFOR
```

As shown in the list above, the first memory hash value q1 is calculated by applying the first hash function f1(·) to a small portion of the decoded data from the decoder 734. Then, the first memory hash value q1 is compared with the first host hash value p1. When the first memory hash value q1 is equal to the first host hash value p1, the second memory hash value q2 is calculated by applying the second hash function f2(·) to the whole decoded data from the decoder 734. Then, the second memory hash value q2 is compared with the second host hash value p2. When the second memory hash value q2 is equal to the second host hash value p2, i.e., the second memory hash value q2 matches the second host hash value p2, the hash comparator 736 may transfer the corresponding decoded data to the controller 720.

Figure 9:
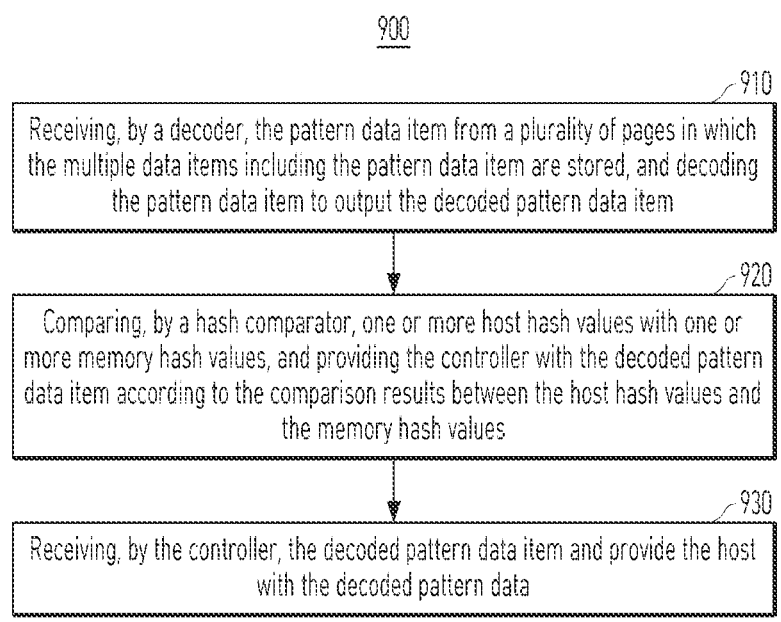
FIG. 9 is a flowchart illustrating a pattern search operation in accordance with another embodiment of the present invention.

FIG. 9 is a flowchart illustrating a pattern search operation 900 in accordance with another embodiment of the present invention. In some embodiments without limitation, the pattern search operation 900 may be performed by the host 710, the controller 720 and the memory device 730 of the system 700, and the controller 720 may include the decoder 734 and the hash comparator 736, as shown in FIG. 7.

Referring to FIG. 9, the pattern search operation 900 may include providing to the host a pattern data item among multiple data items stored in the memory device, in response to a pattern search command from the host. Here, the pattern data item may be associated with a particular pattern.

Operation 910 may include receiving, by a decoder, the pattern data item from a plurality of pages in which the multiple data items including the pattern data item are stored, and decoding the pattern data item to output the decoded pattern data item.

Operation 920 may include comparing, by a hash comparator, one or more host hash values with one or more memory hash values, and providing the controller with the decoded pattern data item according to the comparison results between the host hash values and the memory hash values.

Operation 930 may include receiving, by the controller, the decoded pattern data item and provide the host with the decoded pattern data.

In some embodiments, the host hash values include first and second host hash values, the first host hash value is generated based on a first hash function and a particular sequence, and the second host hash value is generated based on a second hash function and the particular sequence.

In some embodiments, the first host hash value is generated by applying the first hash function to a set portion of the particular sequence, and the second host hash value is generated by applying the second hash function to the particular sequence.

In some embodiments, the first and second host hash values are generated by the host. The pattern search operation 900 may further include: providing, by the host, the controller with the first and second host hash values, and providing, by the controller, the memory device with the first and second host hash values.

In some embodiments, the particular sequence includes m bits corresponding to a length of L, and the set portion includes r bits, where r is less than m.

In some embodiments, the set portion includes first r bits of the particular sequence.

In some embodiments, the memory hash values include first and second memory hash values, the first memory hash value is generated based on the first hash function and the decoded pattern data item, and the second memory hash value is generated based on the second hash function and the decoded pattern data item.

In some embodiments, the first memory hash value is generated by applying the first hash function to a set portion of the decoded pattern data item; and the second memory hash value is generated by applying the second hash function to the decoded pattern data item.

In some embodiments, the second memory hash value is generated by applying the second hash function to the decoded pattern data item when the first memory hash value is the same as the first host hash value.

In some embodiments, the pattern search operation 900 may further include: by the hash comparator, comparing the first memory hash value with the first host hash value; comparing the second memory hash value with the second host hash value when it is indicated that the first memory hash value is the same as the first host hash value; and providing the controller with the decoded pattern data item when it is indicated that the second memory hash value is the same as the second host hash value.

As described above, embodiments provide a system and a method for pattern search by enabling computation capability inside of a memory device (i.e., NAND). This scheme avoids transferring a large amount of data from the memory device to a host, and thus in one embodiment improves pattern search performance and reduces data transfer power.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives. Furthermore, the embodiments may be combined to form additional embodiments.

What is claimed is:

1. A system comprising:
a host configured to generate a pattern search command; and
a memory system including a memory system controller and a memory device for storing multiple data items, the memory system configured to search for a pattern data item among the multiple data items in response to the pattern search command and provide to the host the pattern data item associated with a particular pattern corresponding to the pattern search command, wherein the memory device includes the following internal components:
a plurality of pages for storing the multiple data items including the pattern data item;
a decoder configured to receive, from the plurality of pages, the pattern data item, and decode the pattern data item to output the decoded pattern data item; and
a hash comparator inside the memory device including the plurality of pages for storing the multiple data items and in communication with the memory system controller outside of the memory device including the plurality of pages, and configured to compare one or more host hash values with one or more memory hash values, and provide the memory system controller outside of the memory device with the decoded pattern data item according to the comparison results between the host hash values and the memory hash values, and
wherein the memory system controller is configured to receive the decoded pattern data item from the memory device, and provide the host with the decoded pattern data when the one or more host hash values match the one or more memory hash values.

2. The system of claim 1, wherein the host hash values include first and second host hash values,
wherein the first host hash value is generated based on a first hash function and a particular sequence, and
wherein the second host hash value is generated based on a second hash function and the particular sequence.

3. The system of claim 2, wherein the first host hash value is generated by applying the first hash function to a set portion of the particular sequence, and
wherein the second host hash value is generated by applying the second hash function to the particular sequence.

4. The system of claim 3, wherein the first and second host hash values are generated by the host,
wherein the host provides the memory system controller with the first and second host hash values, and
wherein the memory system controller provides the memory device with the first and second host hash values.

5. The system of claim 3, wherein the particular sequence includes m bits corresponding to a length of L, and the set portion includes r bits, where r is less than m.

6. The system of claim 5, wherein the set portion includes first r bits of the particular sequence.

7. The system of claim 2, wherein the memory hash values include first and second memory hash values,
wherein the first memory hash value is generated based on the first hash function and the decoded pattern data item, and
wherein the second memory hash value is generated based on the second hash function and the decoded pattern data item.

8. The system of claim 7, wherein the first memory hash value is generated by applying the first hash function to a set portion of the decoded pattern data item; and
wherein the second memory hash value is generated by applying the second hash function to the decoded pattern data item.

9. The system of claim 8, wherein the hash comparator is configured to:
generate the second memory hash value by applying the second hash function to the decoded pattern data item when the first memory hash value is the same as the first host hash value.

10. The system of claim 9, wherein the hash comparator is further configured to:
compare the first memory hash value with the first host hash value;
compare the second memory hash value with the second host hash value when the first memory hash value is the same as the first host hash value; and
provide the memory system controller with the decoded pattern data item when the second memory hash value is the same as the second host hash value.

11. A method for operating a memory system including a memory system controller and a memory device, the method comprising:
providing to the host a pattern data item among multiple data items stored in the memory device, in response to a pattern search command from the host, the pattern data item associated with a particular pattern,
wherein the providing of the pattern data item includes:
receiving, by a decoder inside the memory device, the pattern data item from a plurality of pages in the memory device in which the multiple data items including the pattern data item are stored, and decoding the pattern data item to output the decoded pattern data item;
comparing, by a hash comparator inside the memory device including the plurality of pages in which the multiple data items including the pattern data item are stored and in communication with the memory system controller outside of the memory device including the plurality of pages, one or more host hash values with one or more memory hash values, and providing the memory system controller outside of the memory device with the decoded pattern data item according to the comparison results between the host hash values and the memory hash values; and
receiving, by the memory system controller, the decoded pattern data item and provide the host with the decoded pattern data when the one or more host hash values match the one or more memory hash values,
wherein the plurality of pages, the decoder, and the hash comparator are internal components of the memory device.

12. The method of claim 11, wherein the host hash values include first and second host hash values,
wherein the first host hash value is generated based on a first hash function and a particular sequence, and
wherein the second host hash value is generated based on a second hash function and the particular sequence.

13. The method of claim 12, wherein the first host hash value is generated by applying the first hash function to a set portion of the particular sequence, and
wherein the second host hash value is generated by applying the second hash function to the particular sequence.

14. The method of claim 13, wherein the first and second host hash values are generated by the host,
further comprising:
providing, by the host, the memory system controller with the first and second host hash values, and
providing, by the memory system controller, the memory device with the first and second host hash values.

15. The method of claim 13, wherein the particular sequence includes m bits corresponding to a length of L, and the set portion includes r bits, where r is less than m.

16. The method of claim 15, wherein the set portion includes first r bits of the particular sequence.

17. The method of claim 12, wherein the memory hash values include first and second memory hash values,
wherein the first memory hash value is generated based on the first hash function and the decoded pattern data item, and
wherein the second memory hash value is generated based on the second hash function and the decoded pattern data item.

18. The method of claim 17, wherein the first memory hash value is generated by applying the first hash function to a set portion of the decoded pattern data item; and
wherein the second memory hash value is generated by applying the second hash function to the decoded pattern data item.

19. The method of claim 18, wherein the second memory hash value is generated by applying the second hash function to the decoded pattern data item when the first memory hash value is the same as the first host hash value.

20. The method of claim 19, further comprising:
by the hash comparator,
comparing the first memory hash value with the first host hash value;
comparing the second memory hash value with the second host hash value when the first memory hash value is the same as the first host hash value; and
providing the memory system controller with the decoded pattern data item when the second memory hash value is the same as the second host hash value.

* * * * *